US008787634B2

(12) United States Patent
Wiemker et al.

(10) Patent No.: US 8,787,634 B2
(45) Date of Patent: Jul. 22, 2014

(54) APPARATUS AND METHOD FOR INDICATING LIKELY COMPUTER-DETECTED FALSE POSITIVES IN MEDICAL IMAGING DATA

(75) Inventors: Rafael Wiemker, Kisdorf (DE); Roland Opfer, Hamburg (DE); Thomas Buelow, Grosshansdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 817 days.

(21) Appl. No.: 12/519,799

(22) PCT Filed: Dec. 14, 2007

(86) PCT No.: PCT/IB2007/055102
§ 371 (c)(1),
(2), (4) Date: Jun. 18, 2009

(87) PCT Pub. No.: WO2008/075272
PCT Pub. Date: Jun. 26, 2008

(65) Prior Publication Data
US 2010/0002922 A1   Jan. 7, 2010

(30) Foreign Application Priority Data

Dec. 19, 2006   (EP) .................................. 06126451

(51) Int. Cl.
*G06K 9/00* (2006.01)
*G06K 9/36* (2006.01)
*G06K 9/46* (2006.01)

(52) U.S. Cl.
USPC ........... 382/128; 382/130; 382/131; 382/132; 382/236; 382/149

(58) Field of Classification Search
USPC .................... 382/128, 130–132, 291, 294
See application file for complete search history.

(56) References Cited

U.S. PATENT DOCUMENTS

2002/0076091 A1   6/2002 Wang
2003/0076988 A1*  4/2003 Liang et al. .................. 382/131
(Continued)

FOREIGN PATENT DOCUMENTS

WO   2004029851 A1   4/2004
WO   2004046995 A2   6/2004
(Continued)

OTHER PUBLICATIONS

Rivière—"Reduction of noise-induced streak artifacts in x-ray computed tomography through penalized-likelihood sinogram smoothing"—IEEE, 2004, pp. 3239-3243.*

(Continued)

*Primary Examiner* — Matthew Bella
*Assistant Examiner* — Weiwen Yang

(57) ABSTRACT

A data structure for use by a computer system for processing medical image data and representing at least one first region of a patient includes at least one computer-detected feature of interest. The data structure includes a first computer code that is executable to detect first data representing at least one second region included within a respective first region. At least one said feature of interest in said second region has a significant likelihood of representing a computer-detected false positive. The second computer code is executable to provide second data for enabling at least one said first region to be displayed on a display device, such that at least one said second region is displayed on the display apparatus differently from part of said first region not containing features of interest having a significant likelihood of representing computer-detected false positives.

19 Claims, 2 Drawing Sheets

(56) References Cited

U.S. PATENT DOCUMENTS

| | | | |
|---|---|---|---|
| 2003/0095697 A1* | 5/2003 | Wood et al. | 382/131 |
| 2003/0144598 A1* | 7/2003 | Zhang et al. | 600/529 |
| 2004/0184647 A1 | 9/2004 | Reeves et al. | |
| 2005/0171409 A1 | 8/2005 | Arimura et al. | |
| 2005/0207630 A1 | 9/2005 | Chan et al. | |
| 2005/0240882 A1* | 10/2005 | Morita et al. | 715/964 |
| 2006/0177115 A1* | 8/2006 | Fujita et al. | 382/128 |
| 2006/0209063 A1* | 9/2006 | Liang et al. | 345/419 |
| 2007/0177780 A1* | 8/2007 | Chui | 382/128 |

FOREIGN PATENT DOCUMENTS

| | | | |
|---|---|---|---|
| WO | 2006054269 A2 | 5/2006 | |
| WO | 2006054272 A2 | 5/2006 | |

OTHER PUBLICATIONS

Dagli, M. S., et al.; Localization of Cardiac-Induced Signal change in fMRI; 1999; NeuroImage; 9:407-415.

Ritchie, C. J., et al.; Correction of Computed Tomography Motion Artifacts Using Pixel-Specific Back-Projection; 1996; IEEE Trans. on Medical Imaging; 15(3)333-342.

Strickland, R. N.; Tumor Detection in Nonstationary Backgrounds; 1994; IEEE Trans. on Medical Imaging; 13(3) 491-499.

Wiemker, R., et al.; Computer aided lung nodule detection on high resolution CT data; 2002; Medical Imaging; SPIE vol. 4684:677-688.

Xu, S., et al.; Lung Deformation Estimation and Four-dimensional CT Lung Reconstruction; 2006; Acad. Radiol.; 13:1082-1092.

* cited by examiner

APPARATUS AND METHOD FOR INDICATING LIKELY COMPUTER-DETECTED FALSE POSITIVES IN MEDICAL IMAGING DATA

CROSS-REFERENCE TO RELATE APPLICATIONS

This application is a 371 national stage entry of PCT/IB2007/055102 filed Dec. 14, 2007 which claims the benefit of EP 06 126451 filed Dec. 19, 2006.

FIELD OF THE INVENTION

The present invention relates to computer aided detection systems and methods, and relates particularly, but not exclusively, to an apparatus and method for suppressing and indicating computer-detected features of interest in anatomical regions with a significant likelihood of containing computer-detected false positives.

BACKGROUND OF THE INVENTION

The detection and diagnosis of anatomical features of interest such as pulmonary nodules is a standard procedure in radiological practice. The speed and sophistication of current computer-related systems support development of faster and more sophisticated medical imaging systems. The consequential increase in amounts of data generated for processing, and post-processing, has led to the creation of numerous application programs to automatically analyze the medical image date. Thus, various data processing software and systems have been developed in order to assist physicians, clinicians and radiologists, etc., in evaluating medical images to identify and/or diagnose and evaluate medical images. For example, computer aided detection (CAD) systems have been developed to automatically identify "suspicious" regions such as lesions or pulmonary nodules, which could be an indication for lung cancer or may be metastases from other types of cancer.

CAD systems are known which automatically detect (identify and delineate) morphologically interesting regions (e.g. lesions, nodules, calcification) and other structurally detectable regions that might be of clinical relevance. The CAD software automatically marks or highlights medical anomalies in medical images provided from e.g. computer tomography, magnetic resonance, ultrasound or x-ray scanner. For example, in the analysis of a lung image seeking possibly cancerous nodules, the CAD system will mark the nodules detected.

However, false positive markings often occur close to the beating heart due to image artefacts caused by cardiac motion. The heart beat causes erroneous displacements of the image slices, which in turn leads to an apparent discontinuity in, for example, vessel structures, airways and other anatomical features, which can be misinterpreted by the CAD software and thus lead to false positive markings during the computer aided detection process.

False positive markings may also occur due to artefacts caused by breathing motion, photon or energy starvation areas or streak artefacts caused by high-density objects such as metal prostheses, surgical clips, or dental fillings. This can make it more difficult for a radiologist, physician or clinician to classify and interpret the detected features of interest. This could result in an increased period of time needed to assess the CAD results and lead to assessment errors by the physician due to degraded concentration.

SUMMARY OF THE INVENTION

Preferred embodiments of the present invention seek to overcome one or more of the above disadvantages of the prior art.

According to an aspect of the present invention, there is provided a data structure for use by a computer system for processing medical image data representing at least one first region of a patient including at least one computer-detected feature of interest, the data structure comprising:

first computer code executable to detect first data representing at least one second region, included within a respective said first region, wherein at least one said feature of interest in said second region has a significant likelihood of representing a computer-detected false positive; and second computer code executable to provide second data for enabling at least one said first region to be displayed on a display device, such that at least one said second region is displayed on the display apparatus differently from part of said first region not containing features of interest having a significant likelihood of representing computer-detected false positives.

By differentiating the region with a significant likelihood of representing computer-detected false positives from the image data containing all computer-detected features of interest, this provides the advantage of simplifying and therefore accelerating the radiologist's process of evaluating the medical image data including the computer-detected features of interest. For example, in the case of medical images of the lung, false positive markings are most likely to occur in the vicinity of the heart due to cardiac motion artefacts. In order to simplify the evaluation process of the radiologist, those areas are detected automatically and indicated by, for example, visual cues to the radiologist, improving his or her awareness that in those areas the computer aided detection may have limited sensitivity, therefore requiring a visual inspection with extra diligence.

Said first computer code may be executable to detect data representing at least one said second region on the basis of motion, streak artefact and/or photon-starvation of said second region.

This provides the advantage that physiological regions, where computer-detected false positive markings are likely, are identified within the medical image.

Said second computer code may be adapted to cause said second region to be displayed by means of a first set of graphical markers, such as different colored boundary lines.

This provides the advantage that the regions with a significant likelihood of representing false positive markings can be more easily identified by the radiologist, saving time for evaluating the medical image and therefore improving the quality of the assessment by the radiologist.

Said second computer code may also be adapted to cause at least some of said features of interest in at least one said second region to be displayed by means of a second set of graphical markers, such as different colored boundary lines encircling said features of interest. Said second computer code may be adapted to cause display of at least one said feature of interest in at least one said second region to be suppressed.

This provides the advantage of enabling easier differentiation between the feature of interests detected within said first region and the features of interest detected within said second region.

According to another aspect of the present invention, there is provided a computer readable medium carrying a data structure as defined above thereon.

According to a further aspect of the present invention, there is provided a medical data processing apparatus for processing medical image data representing at least one first region of a patient including at least one computer-detected feature of interest, the apparatus comprising at least one processor adapted to process a data structure as defined above.

This provides the advantage of providing medical image data including computer-detected features of interest that are indicated by different graphical markers depending on whether the feature of interest was detected in a region of significant likelihood of false positive markings or not, therefore, improving the effectiveness and quality of the medical image assessment by the radiologist.

According to a further aspect of the invention, there is provided a medical imaging apparatus comprising:

at least one imaging device for forming medical image data representing at least one first region of a patient including at least one computer-detected feature of interest;

a medical data processing apparatus as defined above; and at least one display device for displaying at least one said first region and at least one said second region.

According to a further aspect of the invention, there is provided a method of processing medical image data representing at least one first region of a patient including at least one computer-detected feature of interest, the method comprising:

providing first data representing at least one second region, included within a respective said first region, wherein at least one said feature of interest in said second region has a significant likelihood of representing a computer-detected false positive; and providing second data for enabling at least one said first region to be displayed on a display device, such that at least one said second region is displayed on the display apparatus differently from part of said first region not containing features of interest having a significant likelihood of representing computer-detected false positives.

BRIEF DESCRIPTION OF THE DRAWINGS

A preferred embodiment of the present invention will now be described, by way of example only and not in any limitative sense, with reference to the accompanying drawings, in which.

DETAILED DESCRIPTION OF EMBODIMENTS

Figure 1:
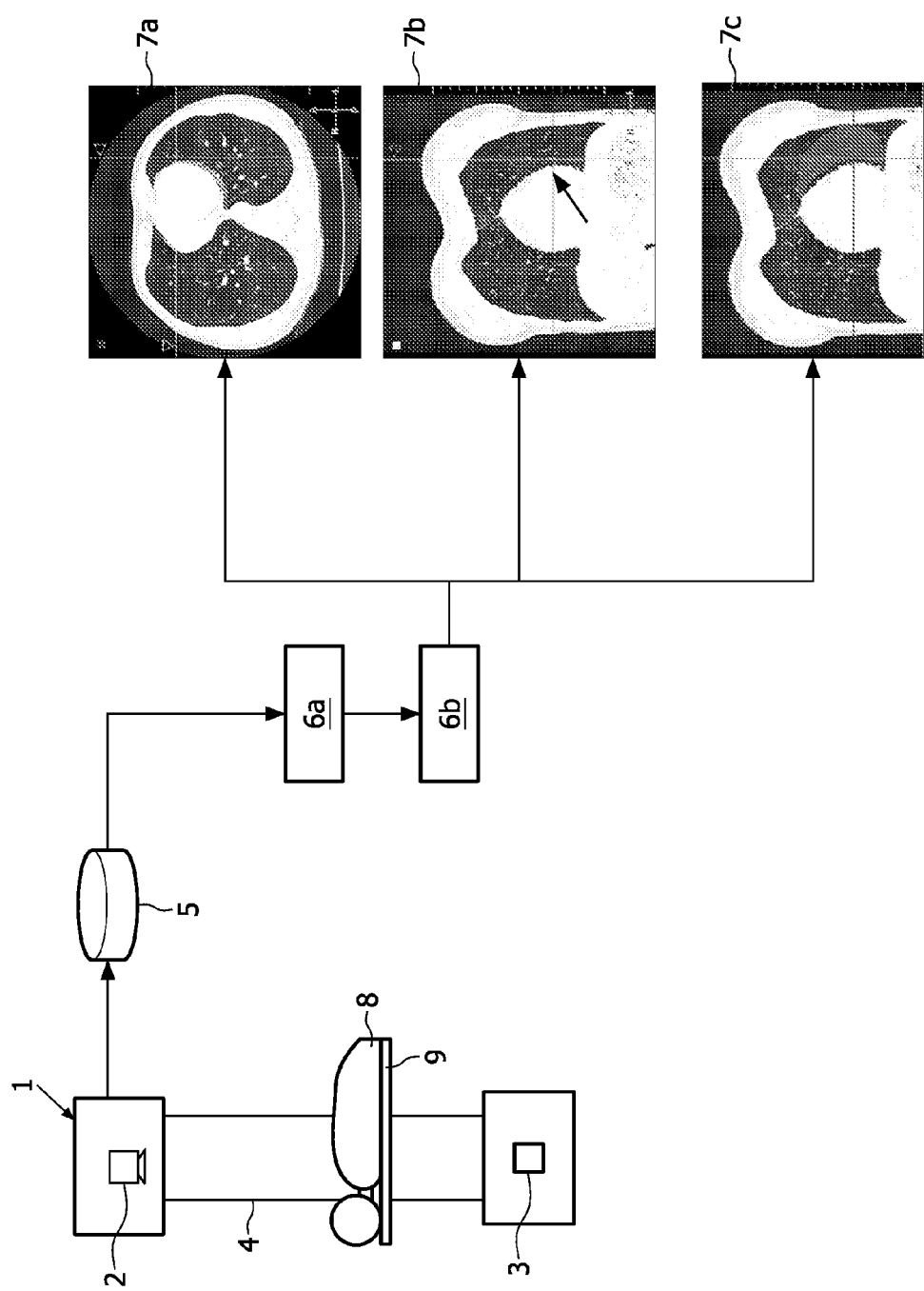
FIG. 1 is a diagrammatic representation of the components of a medical imaging data processing apparatus embodying the present invention.

Referring to FIG. 1, a medical imaging data processing apparatus has a computer tomography (CT) imaging apparatus 1, x-ray sources 2 and detectors 3 arranged in opposed pairs around a circular frame 4. A processor 5 is adapted to execute at least a first computer code 6a and a second computer code 6b producing medical imaging data 7a, 7b and 7c that is displayed on a display device (not shown) in order to assist a physician or radiologist to identify and/or classify features of interest.

A patient 8 is supported on a platform 9 which can be moved in the longitudinal axis of the platform 9 relative to the frame 4 by means of a motor (not shown) under the control of a control unit (not shown). Data detected by the detectors 3 is input to the processor 5. The processor 5 processes the data received using first computer code 6a and second computer code 6b to provide imaging data output 7a, 7b or 7c. The image data output 7a, 7b or 7c is displayed by a display unit (not shown) in order to assist a physician.

The first computer code 6a may include an image-processing algorithm that is able to identify image areas with strong cardiac motion. These areas may be identified as shown in the following example:

After a lung segmentation and thresholding with a threshold of e.g. −400 HU, the image is subjected to a slice-wise 2D distance transformation (a transformation which assigns to each foreground voxel its Euclidean distance to the nearest background voxel). For each voxel at the position (x, y, z), which has a distance value of D(x, y, z)<25 mm, the second derivative L(x, y, z) in the z-direction (i.e. through-slice direction) of the distance map values D, is calculated as L(x, y, z)=2*D(x, y, z)−D(x, y, z−1)−D(x, y, z+1). This value indicates the amount of discontinuous inter-slice-displacement.

To achieve robustness against the noise and spurious inter-slice-displacement-discontinuities L(x, y, z), a range of k=±10 slices is considered around each voxel. Inside this range, the occurring displacement-discontinuity values are ordered by magnitude, and the third largest is taken as the robust displacement discontinuity value L' for this voxel. If this value L' is larger than 7 mm, then the voxel is considered to be part of an image area affected by cardiac motion artefacts. The influence region of this voxel is assumed to be L' multiplied with a range influence factor f=5, with an upper bound of 75 mm. Each nodule candidate which is within this influence region of radius R=f×L' is then suppressed.

Figure 2:
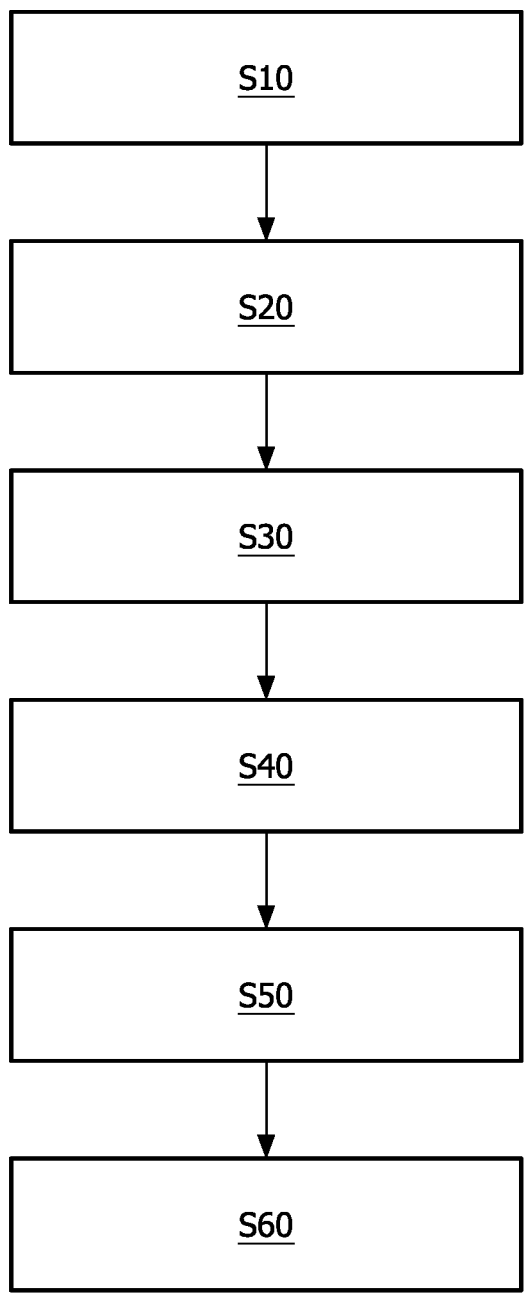
FIG. 2 is a flow diagram showing a method of processing medical image data embodying the present invention.

Referring to FIG. 2, the processor 5 obtains the data representing a region of interest of patient 8 at step S10 and detects lung nodules within the region of interest at step S20. At step S30, regions where a significant likelihood of representing false positives exists are detected using a first computer code 6a. The significant likelihood of false positives could, for example, be caused by physiological motion such as breathing or cardiac movement, existing streak artefacts caused by high-density objects such as metal prostheses, surgical clips, or dental fillings or photon or energy starvation areas.

A second computer code 6b is used by the processor 5 at step S40 to indicate the regions where a significant likelihood of representing false positives exists with graphical cues such as marking the boundaries of the region with a colored line or by coloring that region in a faint color in order to distinguish the region with a significant likelihood of representing false positives within the displayed imaging data.

Furthermore, at step S50 the lung nodules detected within the identified region with a significant likelihood of representing false positives are displayed with a different set of markers from the lung nodules detected in regions with no a significant likelihood of representing false positives. For example, the different sets of detected lung nodules are displayed in different colors or have graphical cues of different shape.

In order to raise the awareness of the physician that the detected regions of cardiac motion, breathing movement, streak artefacts or photon starvation may include more false positives and have only limited detection sensitivity, detected lung nodules are not displayed within the imaging data forcing the physician to inspect that region with extra care.

At step S60 the imaging data output produced by the processor 5 is displayed at a display unit (not shown).

The algorithm mentioned in the above example describes only one way of finding cardiac motion artefacts in CT images. Other embodiments of image processing algorithms, which mark artefact-suffering image regions, may be algorithms finding cardiac motion artefacts (i.e. heart beat) in MR images, such as cardiac motion affected areas in MR-breast images, algorithms finding respiratory motion artefacts (breathing), which are likely to occur near the diaphragm, algorithms finding metal artefacts in CT images (streak artefacts) and algorithms finding photon-starvation areas in CT images (typical near the shoulder and hip-bone areas).

It will be appointed to persons skilled in the art that the above embodiment has been described by way of example only, and not in any limitative sense, and that various alterations and modifications are possible without departure from the scope of the invention as defined by the appended claims.

The invention claimed is:

1. A system for processing medical image data representing at least one first region of a patient including at least one feature of interest automatically detected by a computer, the system comprising:
   at least one processor configured to:
   detect first data representing at least one second region, included within a respective said first region, wherein at least one said feature of interest in said second region has a significant likelihood of representing a false positive automatically detected by a computer, said false positives being caused by at least one of motion, streak artifacts, and photon-starvation, wherein detecting the false positive automatically by the computer includes:
   transforming the medical image data utilizing a slice-wise 2D transformation to generate a distance value for each voxel;
   determining an influence region of each voxel which has a displacement-discontinuity value which exceeds a predetermined threshold; and
   automatically identifying the influence region as said false positives;
   provide second data for enabling at least one said first region to be displayed on a display device; and
   causing the at least one said second region to be displayed on the display apparatus differently from the rest of said first region.

2. The system according to claim 1, wherein detecting the first data includes:
   detecting data representing the at least one second region on the basis of motion of said second region.

3. The system according to claim 1, wherein detecting the first data includes:
   detecting data representing the at least one second region on the basis of streak artifacts of said second region.

4. The system according to claim 1, wherein detecting the first data includes:
   detecting data representing the at least one second region on the basis of photon-starvation of said second region.

5. The system according to claim 1, wherein providing the second data causes said second regions to be depicted by a first set of graphical markers.

6. The system according to claim 5, wherein said first set of graphical markers includes different colored boundary lines of said second regions.

7. The system according to claim 5, wherein providing the second data causes at least some of said features of interest in the at least one second region to be depicted by a second set of graphical markers.

8. The system according to claim 7, wherein said second set of graphical markers includes different colored boundary lines encircling said features of interest.

9. The system according to claim 1, wherein providing the second data causes display of the at least one feature of interest in the at least one second region to be suppressed.

10. The system according to claim 1 further including:
    at least one imaging device configured for forming the medical image data representing the at least one first region of the patient including at least one feature of interest automatically detected by the computer; and
    at least one display device configured for displaying the at least one first region and the at least one second region.

11. The system according to claim 1, wherein the at least one processor is configured to detect at least one secondary region based on motion.

12. A method of processing medical image data representing at least one first region of a patient including at least one feature of interest automatically detected by a computer, the method comprising:
    with a computer determining at least one second region, included within a respective said first region, in which the at least one second region computer-detected features of interest have a significant likelihood of representing a false positive automatically detected by a computer, said false positives being caused by at least one of motion, streak artifacts, and photon-starvation wherein detecting the false positive automatically by the computer includes:
    transforming the medical image data utilizing a slice-wise 2D transformation to generate a distance value for each voxel;
    determining an influence region of each voxel which has a displacement-discontinuity value which exceeds a predetermined threshold; and
    automatically identifying the influence region as said false positives; and
    displaying the at least one first region on a display device and displaying the at least one second region on the display device differently from one or more parts of said first region not containing features of interest having a significant likelihood of representing false positives automatically detected by the computer.

13. The method according to claim 12, wherein the at least one second region are determined with a streak artifact detection image-processing algorithm.

14. A computer readable non-transitory storage medium carrying software configured to control one or more processors to perform the method according to claim 12.

15. A medical imaging system comprising:
    one or more processors configured to:
    in a region of a medical image, automatically detect features of interest by the processor;
    determine at least one sub-region of the region in which sub-region features of interest automatically detected by the processor have a significant likelihood of representing a false positive automatically detected by the processor, wherein detecting the false positive automatically by the computer includes:
    transforming the medical image data utilizing a slice-wise 2D transformation to generate a distance value for each voxel;
    determining an influence region of each voxel which has a displacement-discontinuity value which exceeds a predetermined threshold; and
    automatically identifying the influence region as said false positives; and generate graphical markers which indicate the sub-region; and
a display device which displays the medical image, the graphical markers, and the features of interest automatically detected by the processor;
wherein determining the sub-region includes determining with the one or more processors sub-regions which are subject to at least one of:
motion;
streak artifacts; and
photon-starvation.

16. The medical imaging system according to claim 15, wherein the sub-region includes a lung and the feature of interest includes nodules.

17. The medical imaging system according to claim 15, wherein motion includes at least one of cardiac motion and respiratory motion.

18. The medical imaging system according to claim 15, wherein there are a plurality of sub-regions with features of interest and wherein the one or more processors is further configured to:
mark the sub-regions with the significant likelihood of representing a false positive with first markers; and
mark the sub-regions with no significant likelihood of representing a false positive with second markers, the second markers being different from the first markers.

19. The system according to claim 15, wherein determining the at least one sub regions includes:
detecting a photon-starvation sub-region.

* * * * *